United States Patent [19]
Ashby

[11] Patent Number: 5,486,143
[45] Date of Patent: * Jan. 23, 1996

[54] BELT DRIVE TRANSMISSION

[76] Inventor: David C. Ashby, 610 Fox Valley Dr., Longwood, Fla. 32779

[ * ] Notice: The portion of the term of this patent subsequent to Aug. 4, 2009, has been disclaimed.

[21] Appl. No.: 928,450

[22] Filed: Aug. 12, 1992

[51] Int. Cl.⁶ ............................... F16H 7/00; F16H 55/00
[52] U.S. Cl. ............................................ 474/148; 474/166
[58] Field of Search ................................. 474/148, 149, 474/77–82, 167, 179, 180, 166, 174, 152–153; 280/259–261

[56] References Cited

U.S. PATENT DOCUMENTS

| | | | |
|---|---|---|---|
| 4,099,737 | 7/1978 | Waugh | 474/149 X |
| 4,530,678 | 7/1985 | Wechsler | 474/81 |
| 4,599,079 | 7/1986 | Chappell | 474/80 |
| 4,925,201 | 5/1990 | Leonard | 280/260 X |
| 5,013,285 | 5/1991 | Carlyle | 474/80 |
| 5,102,372 | 4/1992 | Patterson et al. | 474/80 |

*Primary Examiner*—Michael Powell Buiz
*Attorney, Agent, or Firm*—David C. Ashby

[57] ABSTRACT

A belt drive transmission is disclosed which comprises a first gear, a second gear and a belt. The preferred embodiment is for a bicycle transmission which employs a plurality of gears in place of said first and second gears and employs a derailer to move the belt among selected gear ratios. A novel design of gears and a derailer permits the transmission to employ lighter materials thereby reducing the overall weight associated with a transmission.

12 Claims, 4 Drawing Sheets

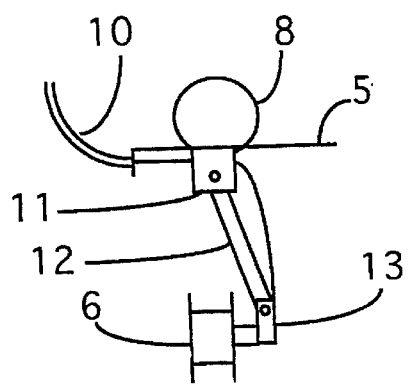
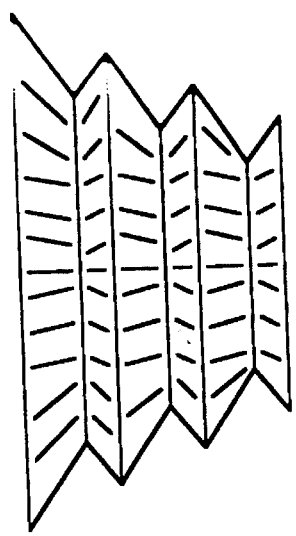
Figure 5c          Figure 6
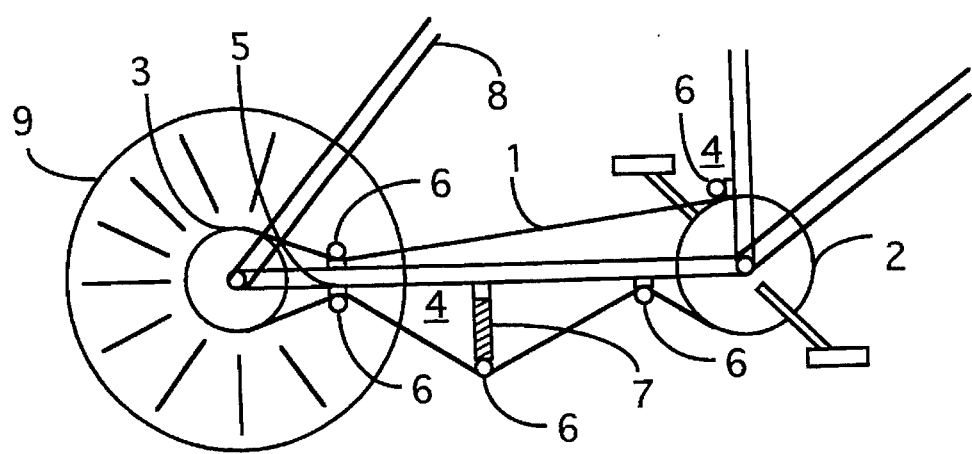
Figure 7

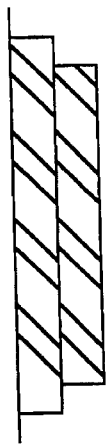
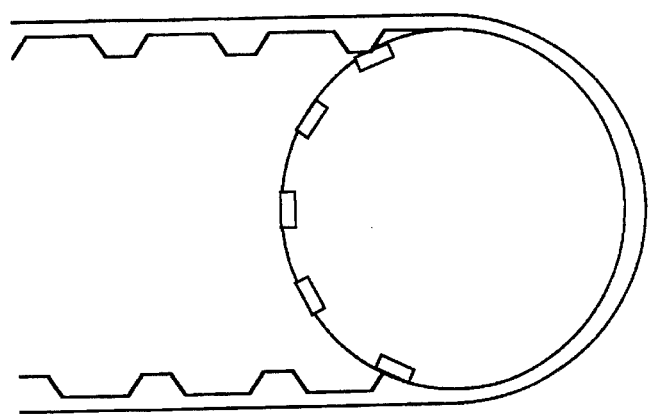
Figure 8a    Figure 8b
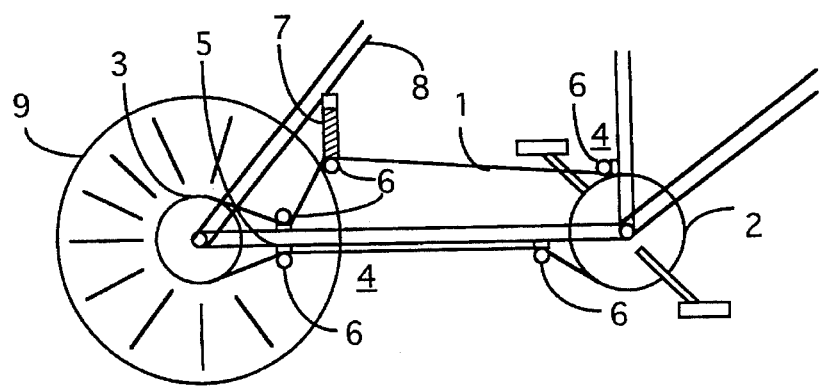
Figure 9

BELT DRIVE TRANSMISSION

FIELD OF THE INVENTION

The field of the invention includes apparatus for transmissions. In the present invention a first gear, which is driven by human or motor means drives a belt which in turn drives a second gear. A preferred embodiment is in the field of bicycle transmissions.

BACKGROUND OF THE INVENTION

Apparatus for bicycle transmissions are numerous. A traditional apparatus employs a chain for driving a rear gear from the force exerted on a front gear by a human. The primary advantage of a chain is that it is strong, assures drive because of the teeth and comprises chain pins which permit the use of a small rear derailer. The primary disadvantage of a chain is the weight of the chain and the weight of the metal gears associated therewith.

Several persons have disclosed belt drive transmissions, but these systems are more complicated than traditional chain apparatus. See for example Maguire (U.S. Pat. No. 5,054,801) and Stuhler (U.S. Pat. No. 5,061,224).

BRIEF SUMMARY OF THE INVENTION

The characteristic novelty of the present invention is that it overcomes deficiencies in the prior art and provides a belt drive apparatus that is less complicated that chain/gear driven apparatus and is lighter than chain/gear driven apparatus.

The present invention comprises a first gear (drive gear), a belt and a second gear (driven gear). It can also comprise a derailer.

In operation, a person will be seated on a bicycle and will be driving the first gear, fixedly attached to the pedals, with the power of his or her legs. Frictionally attached to the circumference of the first gear is a belt. The top of the belt comes under tension upon the force of the human on the first gear. The belt, which is also frictionally attached to the circumference of the second gear, in turn exerts a force on the second gear which is then forced to rotate and thereby propel the bicycle.

In practice, the first gear and second gear will comprise a plurality of gears in order that the rider can adjust the gear ratio for comfortable riding. One of the novel features included in the present invention is the employment of angled ridges on the first gear face and second gear face in a manner to grip the belt while at the same time urging the belt against a gear wall in order to encourage the belt to remain on the selected gear.

Accordingly, a first object of the invention is to provide a belt driven transmission that is lighter and less complicated than any previous apparatus designed.

A second object of the invention is to provide a first and second gear for a belt drive transmission that have benefits of light weight and sufficient friction to discourage slippage and accidental gear malfunction.

A third object of the invention is to provide a derailer for a belt drive transmission that is lighter and less complicated that any previous apparatus designed.

A fourth object of the present invention is to provide a belt drive transmission that can be used for a multitude of purposes beyond that of which the preferred embodiment is for bicycles.

A BRIEF DESCRIPTION OF THE DRAWINGS

FIG. 5 is an illustration of a derailer.

FIG. 5C is an illustration of a derailer.

FIG. 6 is an illustration of an alternative embodiment of a gear employing a friction "V" design.

FIG. 7 is an illustration of a mounting of additional free wheels to reduce belt slack and increase friction surface area.

FIG. 8 is an illustration of an alternative embodiment of a slotted gear and slotted belt.

FIG. 8A is an illustration of a slotted gear.

FIG. 8B is an illustration of a slotted gear and a slotted belt.

FIG. 9 is an illustration of an alternative embodiment of a belt drive transmission mounted on a bicycle.

DETAILED DESCRIPTION

Figure 1:
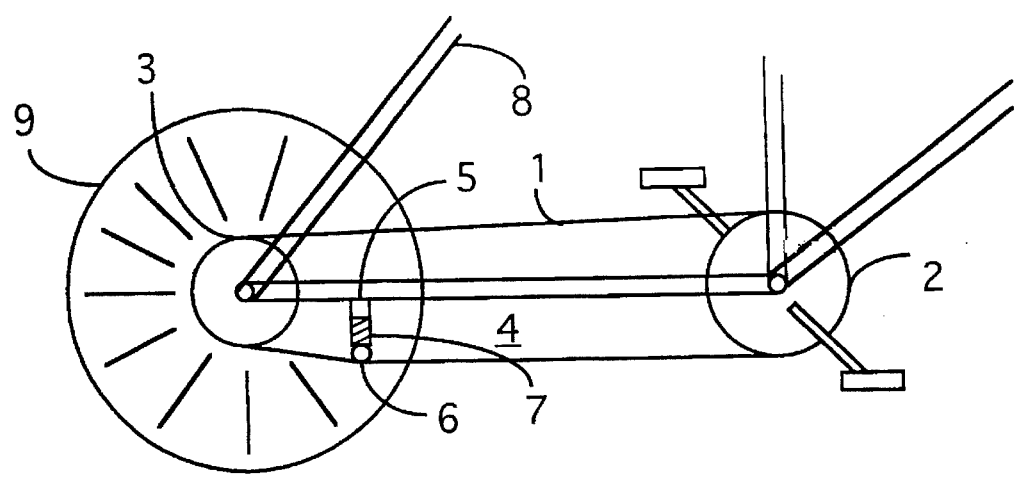
FIG. 1 is an illustration of a belt drive transmission as mounted on a bicycle.

FIG. 1 illustrates a belt drive transmission mounted on a bicycle. The present invention comprises a first gear 2 (drive gear), a second gear 3 (driven gear) and a belt 1. A preferred embodiment of the present invention further comprises a plurality of gears for the first gear 2, a plurality of gears for the second gear 3 and a derailer 4. A characteristic novelty of a preferred embodiment is the gear design which has slanted friction ridges thereon in order to increase friction of the belt against the gear and to encourage the belt to stay in the selected gear. Another embodiment employs "V" shaped gears for the purpose of promoting increased friction and certainty of the belt to stay in the selected gear. Another embodiment employs a slotted gear and correspondingly slotted belt for the purpose of promoting increased friction and drive assurance.

Figure 3:
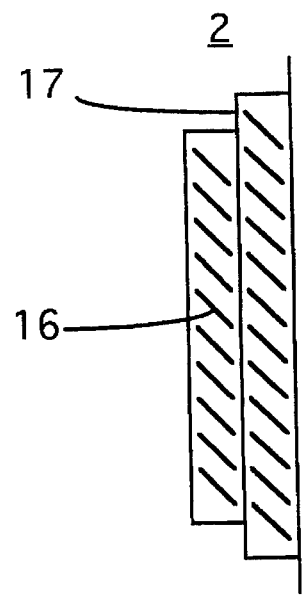
FIG. 3 is an illustration of a first gear, detailing friction ridges.
Figure 4:
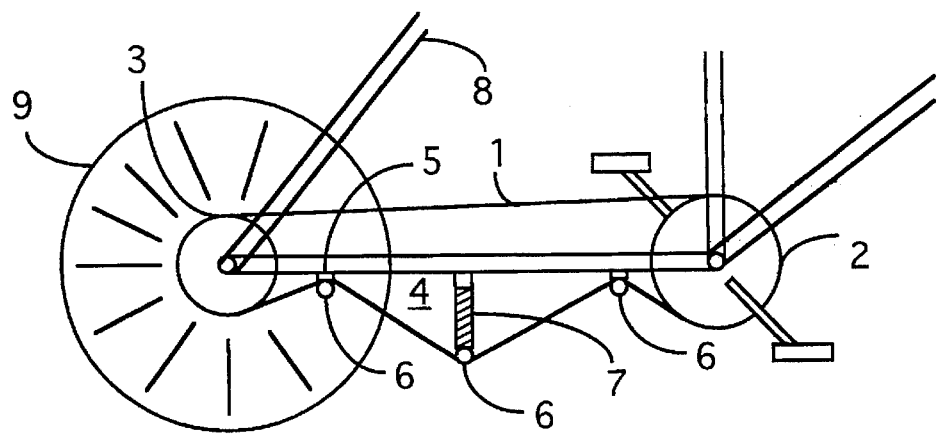
FIG. 4 is an illustration of an alternative embodiment of a belt drive transmission mounted on a bicycle.

Referring to FIG. 1, in operation of a preferred embodiment, a rider sits on the frame 8 of a bicycle and places his or her feet in the pedals and drives the first gear 2 rotationally. The belt is frictionally attached to the first gear by means of ridges 16 on the first gear 2. The ridges are angled in such a manner so as to slightly urge the belt against the gear wall 17. Referring to FIG. 3, on the first gear, which is the drive gear, it can be seen that the ridges initially contact the belt toward the outer (away from the gear wall 17) zone and then contact the belt 1 toward the inner (near the gear wall 17) zone in order to slightly urge the belt against the gear wall 17 and encourage the belt 1 to stay on the selected gear.

The belt 1, which is also frictionally attached to the second gear 3 (driven gear) becomes taught along its upper connection between the first and second gears and drives the second gear 3. The second gear 3 then is forced in rotation and thereby drives the wheel 9 to which it is attached. The second gear 3 comprises similar ridges 16 to that of the first gear. The ridges 16 serve the same purpose which is to slightly urge the belt against the gear wall 17 and encourage the belt 1 to stay on the selected gear.

Figure 2:
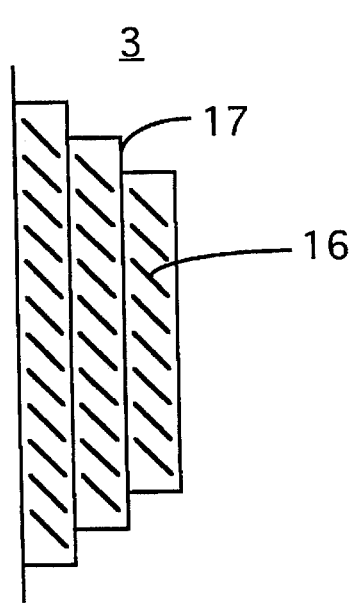
FIG. 2 is an illustration of a second gear, detailing friction ridges.
Figure 5A:
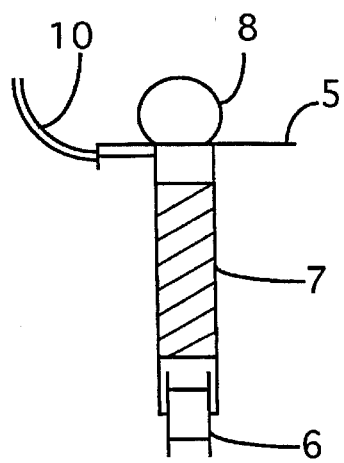
FIG. 5A is an illustration of a derailer.
Figure 5B:
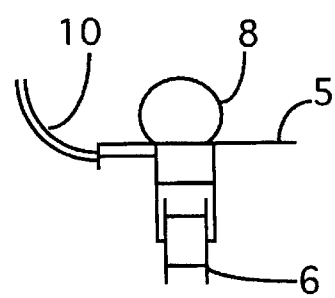
FIG. 5B is an illustration of a derailer.

As can be seen in FIGS. 2 and 3, a preferred embodiment employs a plurality of gears for the purpose of gear selection by the rider and to adjust the input force necessary to propel the bicycle. For this purpose a gear changing means is necessary. In the preferred embodiment the gear changing means comprises a derailer 4. The derailer 4 serves two functions: first, it serves to direct the belt 1 to the selected gear and to encourage the belt to stay in the selected gear; and second, it serves to maintain tension in the lower belt section so that slack does not build up. Referring to FIG. 5, the derailer 4 comprises a free wheel 6, a belt tensioner 7, and a lateral movement track 5. The derailer 4 is moved along the lateral track by means of a cable 18. Referring to FIG. 5C, the derailer 4 may also be manipulated angularly in that the free wheel 6 may have a rounded type belt engaging portion and the cable 18 may serve to displace the free wheel 6 laterally by angularly altering the derailer with respect to the bicycle frame 8. Also, the derailer 4 may be moved laterally by the cable 18 operating against a spring device which laterally moves the free wheel 6. The spring device can be located in the derailer itself or on the frame 8 of the bicycle. In FIG. 5C the derailer 4 is comprised of several arms 11, 12 and 13 which are connected to one another and mounted to the frame 8. As can be seen by a person skilled in the art, a spring may be inserted between the arms or the number of arms could easily be reduced to a minimum of 1.

In an embodiment that has only a single first gear 2 and a single second gear 3, a constant tension device located in approximately the same area as the derailer 4 of the preferred embodiment of FIG. 1 is a good idea because a constant tension device serves to avoid slack buildup. A constant tension device may comprise a spring and free wheel.

Another alteration that can be accomplished to the preferred embodiment, referring to FIG. 7, includes the mounting of free wheels on the frame 8 of the bicycle in order to force the belt to travel along more surface area of the first gear 2 and second gear 3 and which also provides for additional adjustment for a tensioner or derailer 4.

Another embodiment, referring to FIG. 6, employs a friction "V" gear design. The friction "V" gear design is beneficial in that it provides more surface area for friction and the belt is positively locked in the gear. A drawback to the friction "V" gear design is that the belt must overcome the extra displacement necessary for it to enter into a different gear.

Another embodiment, referring to FIG. 8, employs a slotted gear and belt design. The slotted design is much like the friction ridge design but with larger ridges and corresponding valleys in the belt. The slotted design is beneficial in that it provides more surface area for friction and the belt is positively locked in the gear. The slots may be angled and a gear wall can be constructed to accomplish the beneficial qualities discussed above with respect to angled friction ridges.

A modification to the embodiments can be made by placing a belt tensioner in the above gear position as illustrated in FIG. 9. FIG. 9 shows a tensioner 7 comprising a free wheel 6 to keep the belt 1 taut. Furthermore, FIG. 9 illustrates two derailers 4, one located in the front next to first gear 2, and one in the back next to second gear 3. There are also free wheels placed on the frame 8 which serve to maintain a high constant belt friction area with the first gear 2 and second gear 3.

Having disclosed the preferred embodiment in the best mode, several modifications will be obvious to one skilled in the art. This disclosure is intended to cover all modifications to my invention that are in the spirit of my invention that I now claim.

I claim:

1. A bicycle transmission comprising:

a belt communicating with a first gear and a second gear, said communication being substantially on a circumferential surface of said first gear and said second gear;

said first gear having first angled means for frictionally communicating with said belt and for urging said belt against a first gear wall adjacent to the circumferential surface of said first gear; and said second gear having second angled means for frictionally communicating with said belt and for urging said belt against a second gear wall adjacent to the circumferential surface of said second gear.

2. A bicycle transmission as in claim 1, wherein:

said first angled means are friction ridges; and said second angled means are friction ridges.

3. A bicycle transmission as in claim 1, wherein:

said first gear has a belt contact area comprising no more than one substantially perpendicular surface, with respect to the movement of said belt; and said second gear has a belt contact area comprising no more than one substantially perpendicular surface, with respect to the movement of said belt.

4. A bicycle transmission as in claim 1, wherein:

said first angled means are slots;

said second angled means are slots; and said belt has complementary means for communicating with said first angled means and said second angled means.

5. A bicycle transmission as in claim 4, wherein:

said belt has a substantially round cross section.

6. A bicycle transmission as in claim 4, wherein:

said belt has a substantially circular cross section.

7. A bicycle transmission as in claim 1, wherein:

said second gear comprises a plurality of gears; and said bicycle transmission further comprises:

a derailer for moving said belt from one of said plurality of second gears to another of said plurality of second gears.

8. A bicycle transmission as in claim 1, wherein:

said first gear comprises a plurality of gears;

said second gear comprises a plurality of gears; and said bicycle transmission further comprises:

a first derailer for moving said belt from one of said plurality of first gears to another of said plurality of first gears, and a second derailer for moving said belt from one of said plurality of second gears to another of said plurality of second gears.

9. A bicycle transmission as in claim 8, further comprising:

a free wheel located near the lower side of said first gear exerting an upward force on said belt;

a tensioner located approximately halfway between the lower side of said first gear and said second gear, exerting a downward force on said belt; and said second derailer is located near the lower side of said second gear exerting an upward force on said belt.

10. A bicycle transmission as in claim 8, further comprising:

a belt tensioner comprising a free wheel and means for pressing said free wheel against said belt to displace said belt.

11. A bicycle transmission comprising:

a belt communicating with a first gear and a second gear said communication being substantially on a circumferential surface of said first gear and said second gear, said first gear having a substantially "V" shaped belt communication surface, and said second gear having a substantially "V" shaped belt communication surface.

12. A bicycle transmission as in claim 11, wherein:

said belt has a substantially circular cross section.

\* \* \* \* \*